June 23, 1931.  J. L. DRAKE  1,810,908
METHOD AND APPARATUS FOR PRODUCING SHEET GLASS
Filed Dec. 24, 1928  2 Sheets-Sheet 1
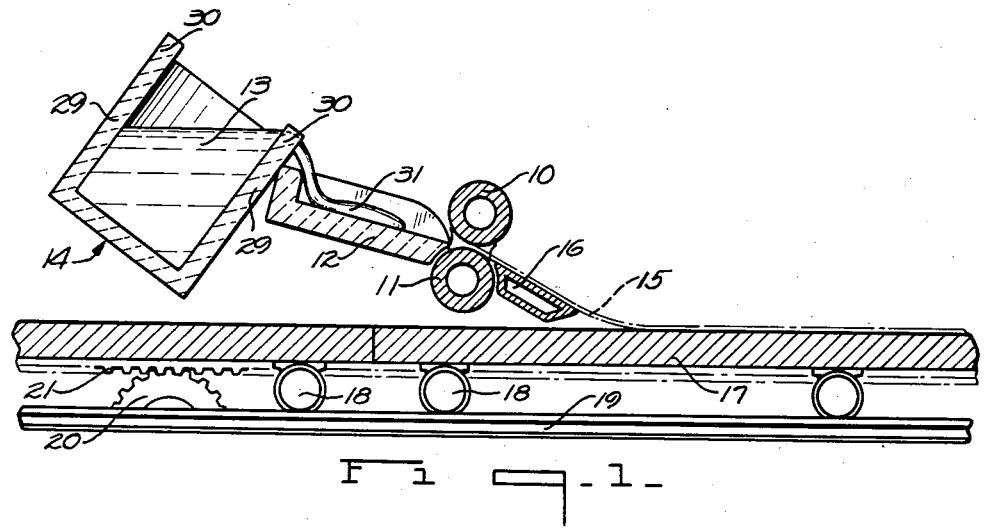
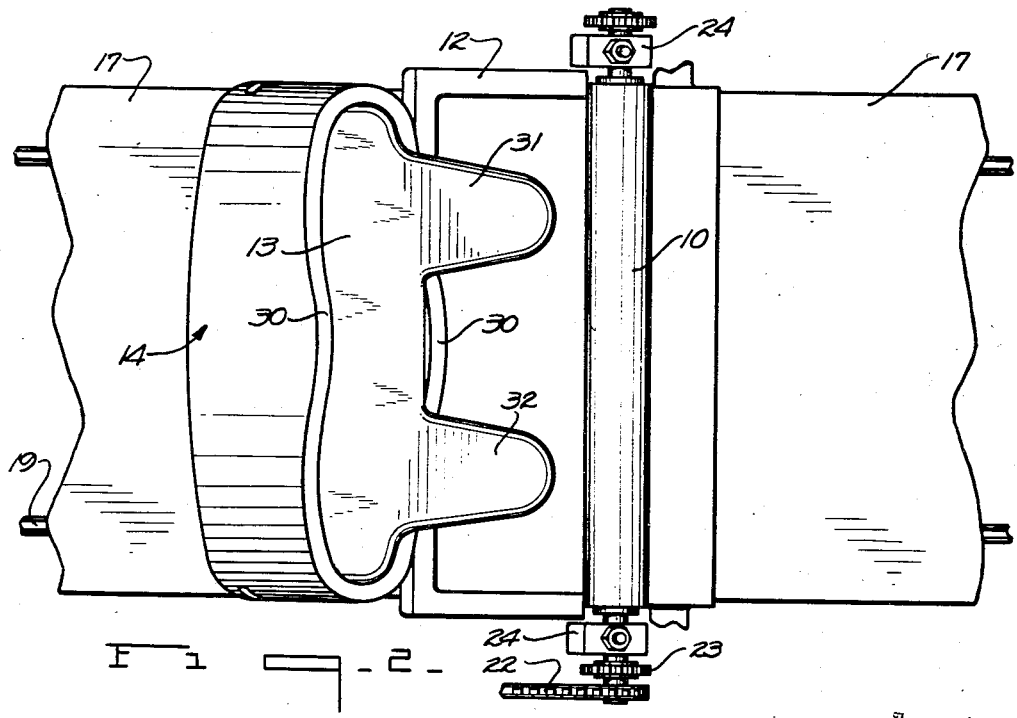
Inventor
John L. Drake
By Frank Fraser,
Attorney June 23, 1931.   J. L. DRAKE   1,810,908
METHOD AND APPARATUS FOR PRODUCING SHEET GLASS
Filed Dec. 24, 1928   2 Sheets-Sheet 2
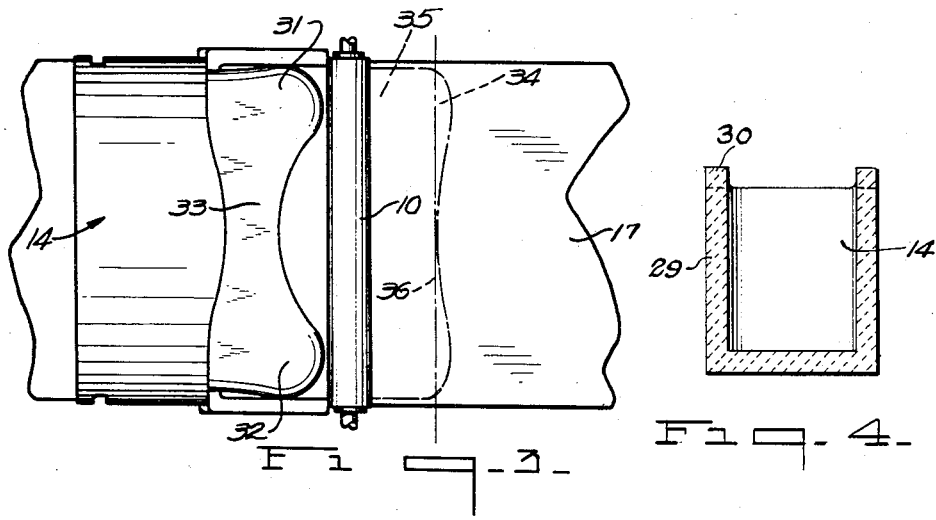
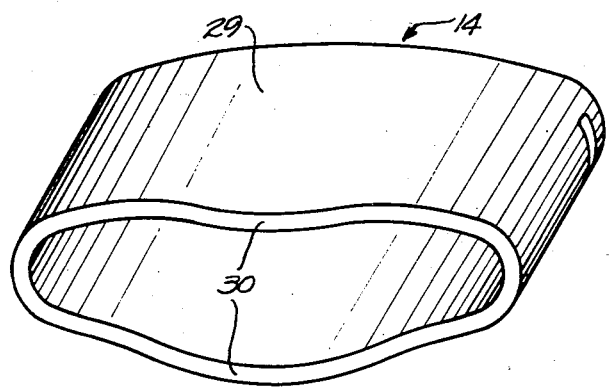

Patented June 23, 1931

1,810,908

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR PRODUCING SHEET GLASS

Application filed December 24, 1928. Serial No. 328,072.

This invention relates to a method and apparatus for the manufacture of sheet or plate glass.

According to one method commercially used in the production of sheet glass, a relatively large charge or pour of molten glass is flowed from a receptacle or pot and deposited en masse upon a substantially horizontally arranged receiver or slab, the said receiver being then tilted to cause the glass to be moved therefrom between a pair of forming rolls associated with one end thereof, the glass being reduced by said rolls to a sheet of substantially predetermined and uniform thickness. In such method, it has been found that the glass will flow from the receiver in a relatively narrow stream first between the centers of the forming rolls and will then gradually spread out across the length of the rolls. Thus, the head or initial portion of the sheet formed will be relatively narrow and the said sheet will gradually become wider until it attains the net width desired. This relatively narrow head portion of the sheet must then be removed or cut from the main body thereof since it is not commercially usable and such removal thereof naturally involves considerable waste and furthermore results in the reduction of the size of sheet produced.

The general object of the present invention is to avoid the above objectionable feature incident to the operation of the method described by providing an improved method and apparatus whereby the molten glass may be deposited upon the receiver in a more efficient manner to the end that the spreading of the glass laterally thereupon may be more rapidly effected and the sheet produced brought more quickly to its desired net width. Thus, the amount of glass which must be trimmed from the head or initial portion of the sheet produced is minimized and as a result the amount of waste is greatly reduced and the length of sheet formed correspondingly increased.

Another object of the invention resides in the provision of such a method and apparatus wherein the molten glass is initially flowed upon the receiver adjacent the opposite ends thereof and then subsequently in the center so that the glass stream passing to the forming rolls is spread from opposite sides toward the center instead of from the center toward opposite sides as heretofore.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through apparatus provided by the present invention.

Fig. 2 is a plan view thereof.

Fig. 3 is a diagrammatic plan view showing the manner in which the molten glass flows upon the receiver in accordance with the present invention.

Fig. 4 is a transverse section through the improved receptacle or pot, and

Fig. 5 is a perspective view thereof.

Referring to the drawings, there is illustrated a sheet forming mechanism including a pair of substantially superposed forming rolls 10 and 11 spaced from one another to create a sheet forming pass therebetween. The numeral 12 designates an inclined receiver or slab adapted to receive thereupon the molten glass 13 from the receptacle or pot 14 and to deliver it to the forming rolls. These rolls functions to reduce the molten glass to a sheet 15 of substantially predetermined and uniform thickness, said sheet passing downwardly from the rolls over an inclined runway or apron 16 onto one or a plurality of cars or carriers 17. These cars or carriers may be provided with wheels 18 running upon tracks 19 and may be driven from a drive pinion 20 meshing with rack bars 21 secured to the under sides or bottoms thereof. One of the forming rolls 10 or 11 is adapted to be positively driven such as through a chain drive 22 and the other roll is adapted to be driven from the positively driven roll through intermeshing gears 23 carried by the shafts of said rolls and which shafts are journaled at their opposite ends in bearing brackets 24.

According to the present invention, the molten glass is deposited upon the receiver in a novel and efficient manner to the end that the glass will be spread more quickly over the receiver whereby the sheet will more rapidly attain its desired width. This is herein effected by constructing the receptacle or pot 14 of oval formation as clearly illustrated in Fig. 5. The side walls 29 of the pot are provided with upwardly curved lips 30 which are highest at substantially the longitudinal center of the pot and gradually decrease toward the opposite ends thereof. When using such a pot, it will be seen, upon reference to Fig. 2, that upon initial tilting of said pot, the glass will flow therefrom adjacent the opposite ends thereof in the form of two relatively narrow spaced streams 31 and 32, the lip 30 preventing the glass from flowing from the center of the pot. Upon continued tilting of the pot, however, the glass will flow from the center thereof and this central flow indicated at 33 will effect a uniting of the spaced streams 31 and 32 to form a single stream. The stream of glass will thus then take the form shown in Fig. 3 and will be of a width substantially equal to the length of the receiver and forming rolls. As the glass then passes between the forming rolls, the end portions 31 and 32 will be spread inwardly toward the center so that the head portion 34 of the sheet 35 will take substantially the form illustrated in broken lines. The head portion 34 can then be cut transversely along the line 36 and it will be clearly apparent that the amount of waste incurred with this method will be reduced to a minimum. Since the glass is spread more efficiently and uniformly over the receiver, the sheet 35 will more quickly attain its desired width so that not only will the amount of waste be greatly reduced, but the length of sheet obtained from a given quantity of glass likewise increased.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim

1. In the manufacture of sheet glass, the method consisting in setting-up a moving stream of molten glass, and in reducing the stream to a sheet of substantially predetermined and uniform thickness by spreading it from opposite sides toward the center.

2. In the manufacture of sheet glass, the method consisting in setting-up a moving stream of molten glass, and in reducing the stream to a sheet of substantially predetermined and uniform thickness by rolling first the border portions of the stream and subsequently the central portion thereof.

3. In the manufacture of sheet glass, the method consisting in setting-up a moving stream of molten glass, advancing the border portions of the stream ahead of the central portion thereof, and in reducing the stream to a sheet of substantially predetermined and uniform thickness by spreading the border portions thereof toward the center.

4. In the manufacture of sheet glass, the method consisting in setting-up a moving stream of molten glass, advancing the border portions of the stream ahead of the central portion thereof, and in then reducing the stream to a sheet of substantially predetermined and uniform thickness by rolling first the border portions and subsequently the central portion thereof.

5. In the manufacture of sheet glass, the method consisting in initially setting-up a plurality of spaced moving streams of molten glass, subsequently creating a central stream to unite the spaced streams to form a single stream, and in then reducing the single stream to a sheet of substantially predetermined and uniform thickness.

6. In the manufacture of sheet glass, the method consisting in delivering a stream of molten glass to a sheet-forming pass, and in advancing the stream so that the side portions thereof will engage the forming pass ahead of the central portion.

7. In the manufacture of sheet glass, the method consisting in delivering a stream of molten glass to a sheet forming pass, advancing the stream so that the side portions thereof will engage the forming pass ahead of the central portion, and in reducing the stream to a sheet of substantially predetermined and uniform thickness by spreading the side portions of the stream toward the center.

8. In the manufacture of sheet glass, the method consisting in pouring a stream of molten glass upon an inclined supporting surface, advancing the edge portions of the stream ahead of the central portion thereof, and in rolling the stream to a sheet of substantially predetermined and uniform thickness as it leaves said surface.

9. In the manufacture of sheet glass, the method consisting in pouring a stream of molten glass upon an inclined supporting surface, advancing the stream so that the edge portions thereof will leave said surface ahead of the central portion, and in rolling the stream to a sheet of substantially predetermined and uniform thickness by spreading the edge portions toward the center.

10. In combination in apparatus for producing sheet glass, a pair of sheet forming rolls, means for delivering a stream of molten glass to said rolls, and means acting to temporarily retard the central portion of the stream to allow the border portions thereof to advance toward the forming rolls ahead of said central portion.

11. In combination in apparatus for producing sheet glass, an inclined receiver, a pair of sheet forming rolls arranged at one end thereof, means for flowing a stream of molten glass upon the receiver, and means carried by said first named means acting to temporarily retard the central portion of the stream to allow the border portions thereof to advance toward the forming rolls ahead of said central portion.

12. In combination in apparatus for producing sheet glass, a pair of sheet forming rolls, tiltable means for delivering a stream of molten glass to said rolls, and means acting to retard the central portion of the stream until said tiltable means is moved to a predetermined angle to allow the border portions of the stream to advance toward the forming rolls ahead of the central portion.

13. In combination in apparatus for producing sheet glass, an inclined receiver, a pair of sheet forming rolls arranged at one end of the receiver, tiltable means for delivering a stream of molten glass upon the receiver, and means carried by the tiltable means acting to retard the central portion of the stream until said tiltable means is moved to a predetermined angle whereby to allow the border portions of the stream to advance toward the forming rolls ahead of the central portion thereof.

14. In combination in apparatus for producing sheet glass, a pair of sheet forming rolls, an elongated receptacle containing a mass of molten glass and adapted, when tilted, to deliver the glass to said rolls in stream form, and means carried by said receptacle at substantially the longitudinal center thereof to temporarily retard the central portion of the stream upon initial tilting thereof to allow the glass at the end portions thereof to flow therefrom in advance of the glass at the central portion.

15. In combination in apparatus for producing sheet glass, an inclined receiver, a pair of sheet forming rolls arranged at one end of the receiver, an elongated receptacle containing a mass of molten glass and adapted, when tilted, to deliver the glass upon the receiver in stream form, one side wall of the receiver being provided with an upstanding lip at substantially the longitudinal center thereof so that when the receptacle is tilted the glass will flow therefrom first adjacent its opposite ends and subsequently from the center over said lip.

16. In sheet glass apparatus, a receptacle containing a mass of molten glass, said receptacle being adapted to be tilted to discharge the glass therefrom, a receiver for receiving the molten glass from the receptacle, a pair of sheet forming rolls adapted to receive the molten glass from the receiver and reduce it to sheet form, and means carried by the receptacle for causing the molten glass, upon initial tilting of said receptacle, to flow therefrom onto the receiver in a pair of spaced streams and upon continued tilting to cause the streams to unite into a single stream.

Signed at Toledo, in the county of Lucas and State of Ohio, this 18th day of December, 1928.

JOHN L. DRAKE.